Nov. 24, 1953    H. W. SIGWORTH ET AL    2,660,678
MEASUREMENT OF FILMS AND DEPOSITS
Filed Feb. 8, 1951    3 Sheets-Sheet 1

INVENTORS
HARRISON W. SIGWORTH
BERNARD A. FRIES
BY *A. L. Snow.*
*Charles J. Gibean*
ATTORNEYS Nov. 24, 1953 H. W. SIGWORTH ET AL 2,660,678
MEASUREMENT OF FILMS AND DEPOSITS
Filed Feb. 8, 1951 3 Sheets-Sheet 2

INVENTORS
HARRISON W. SIGWORTH
BERNARD A. FRIES

BY *A. L. Snow*

*Charles J. Gibeau*
ATTORNEYS

Nov. 24, 1953  H. W. SIGWORTH ET AL  2,660,678
MEASUREMENT OF FILMS AND DEPOSITS
Filed Feb. 8, 1951  3 Sheets-Sheet 3

INVENTORS
HARRISON W. SIGWORTH
BERNARD A. FRIES
BY
ATTORNEYS

Patented Nov. 24, 1953

2,660,678

UNITED STATES PATENT OFFICE 2,660,678

MEASUREMENT OF FILMS AND DEPOSITS

Harrison W. Sigworth and Bernard A. Fries, El Cerrito, Calif., assignors to California Research Corporation, San Francisco, Calif., a corporation of Delaware Application February 8, 1951, Serial No. 209,968

6 Claims. (Cl. 250—83)

This invention relates to the measurement of films and deposits formed or occurring on surfaces and particularly to the measurement of films and deposits or changes therein of an amount not readily determinable by ordinary means or occurring in places not accessible to the usual means for measurement.

Heretofore, much difficulty has been encountered in determining the physical dimensions or quantities of deposits occurring on the inner walls of many types of enclosed spaces. For example, to determine the amount of deposits formed on the walls of a fuel induction system for an internal combustion engine during its operation, one method used has been to place the engine out of operation, disassemble the parts of the induction system and wash the inner walls thereof with a solvent to dissolve off from them whatever deposits the solvent would place in solution. Those deposits not affected by the solvent were scraped from the walls. The solvent was then removed from the deposits, for example, by distillation or evaporation, and the total deposits were combined and weighed to determine the amount. After determining the area of the surface from which the deposits were removed, the apparent thickness of deposit per unit area could be calculated. This method necessitated the engine being operated for a considerable period of time to give a sufficient accumulation of deposits for reasonable accuracy of measurement and also required that the engine be taken out of operation for a period of time while it was disassembled and cleaned of the deposits. Before it could be used again, more time was required to re-assemble the parts and place the assembly in condition for operation. In a testing program, the time factor and expense involved in these operations are important considerations.

One particular application of this invention is the measurement of such deposits. By this invention it is possible to obtain a determination of the deposits formed in a specific area of a fuel induction system after a much shorter running period than was required by the method described above, and without the necessity of taking the engine out of operation for any appreciable time, or of disassembling its parts.

In this exemplary embodiment, the invention takes the form of a plug which is received in a suitable opening in the wall of a fuel induction chamber so that an end surface of the plug is disposed within the interior of the chamber and flush with the surface of the inner wall thereof. Prior to placing the plug in the induction system, the end of the plug is made radioactive, and the amount of radiation emanating from it is measured. The engine is operated, with the plug in place, and the deposits which form on the inner walls of the induction system also are formed on the radioactivated end of the plug. After a measured interval of operating time, the plug with its accumulated deposits is removed from the wall of the induction system. By comparing the radiation from the plug and after operation with that noted initially, the attenuation of radiation due to the absorbing effect of the deposits can be determined, which is a measure of the amount of deposits formed on the end of the plug. This is also a measure of the amount of deposits per unit area formed in that portion of the induction system adjacent the location of the plug.

However, this invention is not limited to this specific application of use, but has a wide range of utility under many conditions where it is desired to determine the physical dimensions or rate of build-up of a deposit, or the deposit-forming propensities of substances on surfaces exposed to them.

An object of this invention is to provide a means for determining the presence and changes in thickness of deposits where such determinations are not readily susceptible to being measured by such means as are usually employed for such purposes.

A further object of this invention is to provide a means which can be employed accurately to determine the thickness of a deposit of a substance formed or occurring on the inner walls of an enclosed space, which walls normally are inaccessible for direct examination.

Another object of this invention is to provide a means for indicating the quantity of material deposited on the walls of an enclosed chamber or conduit, without the necessity of dismantling and disassembling the apparatus of which the closed chamber or conduit is a part to make such closed spaces accessible for measurement.

Still another object of this invention is to provide a means for determining the rate of build-up of a deposit in a shorter time interval and with greater accuracy than heretofore has been possible.

Another object of this invention is to provide a means whereby the proclivity of a substance to form a deposit can be determined accurately and conveniently, and, also, as a corollary, to provide a means whereby the relative lack of deposit-forming characteristics of various substances can be evaluated.

Other objects of this invention will be obvious, or will become apparent from the description of several exemplary embodiments of it as set forth herein. Such embodiments as are described and shown in the drawings are not intended to delineate the sole field of application of this invention, but are presented to aid the disclosure of the inventive concept.

Referring to the drawings.

Figure 1:
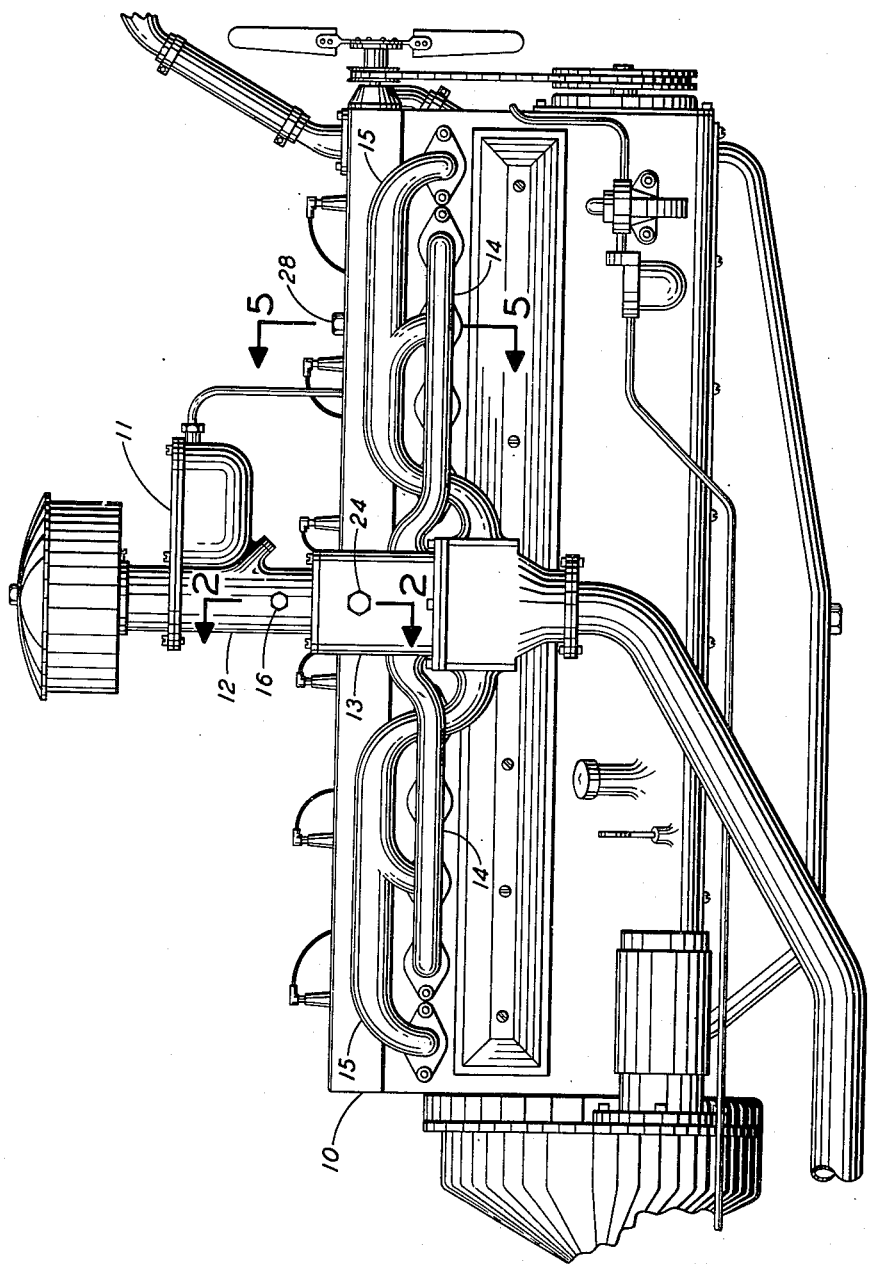
Fig. 1 represents a view, in elevation, of an internal combustion engine in which has been placed radioactive plugs for measuring the deposits occurring in selected portions thereof.

In Fig. 1, the numeral 10 represents a conventional form of internal combustion engine. The fuel and air mixture from the carburetor, designated as 11, is conducted through a throttle valve chamber 12, a heat exchange chamber 13, and a branched intake manifold 14, to the respective cylinders of the engine. The hot exhaust gases from the cylinders are conducted by manifolds 15 past the heat exchange chamber 13, where they give up some of their heat to the fuel mixture, and are led through suitable conduits to the atmosphere, all in a well-known manner.

With some types of fuels, and under some engine operating conditions, deposits will form on the walls of the induction system, either substantially uniformly throughout the system, or, in some cases, they may be accumulated in segregated portions thereof to a degree which may seriously hamper efficient engine operation. It is desirable to know what fuels and what operating conditions will cause objectionable deposits, and the extent of the deposits so formed.

One method that has been practiced for obtaining such knowledge required that the engine be operated for several hundred hours under closely controlled conditions and with a definite fuel until there was a sufficient build-up of deposits to be observed and measured by means such as those described hereinabove. Each time a fuel or an engine operating condition was changed for test purposes, the whole laborious and time-consuming process was repeated.

Figure 2:
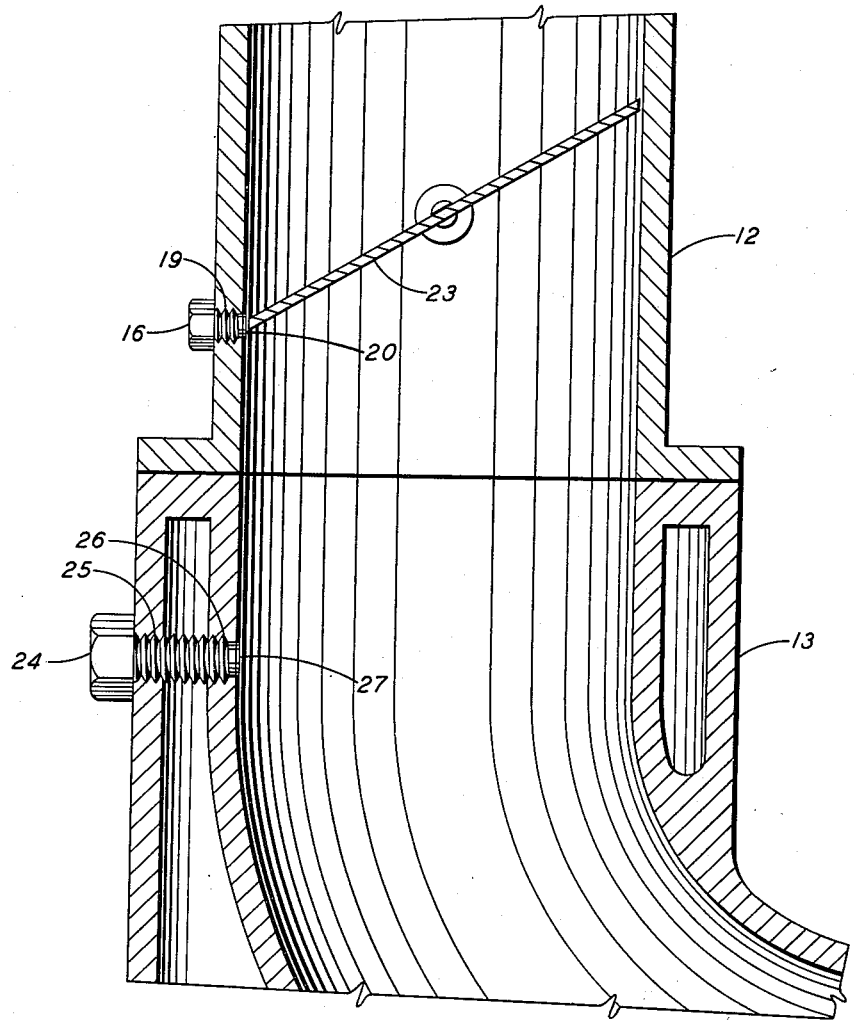
Fig. 2 represents a section through a portion of the fuel induction system of an internal combustion engine, along the line 2—2 of Fig. 1, and shows the disposition of the radioactive plugs for measuring deposits in this portion of the apparatus.
Figure 3:
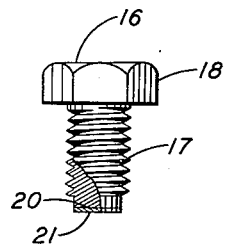
Fig. 3 represents, partly in section, a radioactivated plug, incorporating features of this invention.

In applying the present invention to determining such factors, use is made of a plug 16, Fig. 3, of metal or other suitable material, which has screw threads 17 formed on its outer peripheral surface and a head 18 formed on one end to receive a tool, in a manner similar to that employed on standard machine screws. The plug is made of sufficient length to extend through an appropriate opening, as 19, Fig. 2, in the wall of a chamber so that its inner end 20 is substantially flush with the interior surface thereof. In this position the deposits which form in this area on the interior wall of the chamber also will form on the end of the plug.

The plug is prepared for use in this invention by making the surface to be exposed within the interior of the chamber radioactive. This may be accomplished, for example, by making the whole plug radioactive as by incorporating a radioisotope in its composition, or by irradiating it in an atomic pile, or by selectively exposing the end face of the plug to a suitable source of electro-magnetic radiation or nuclear particles to make it radioactive to a predetermined depth below the surface, or by forming, depositing, or placing a radioactive material on the end face of the plug in a manner to be described.

In one embodiment of the invention, the end of the plug is made radioactive by forming or depositing on it a radioactive sulfur compound. This is accomplished by heating a ferrous metal plug in a mineral oil containing a small amount of dissolved elemental sulfur admixed with radiosulfur, $S^{35}$. Prior to immersion in the oil, all of the surfaces of the plug except the end face 20 may be coated with a lacquer or other suitable material to prevent the deposition of the radioactive sulfur on all but the end surface. When the plug is heated for 10 to 20 minutes at approximately 400° F. in 10 cc. of a mineral oil to which has been added approximately 21 mg. of radioactively labeled elemental sulfur having a total counting rate of $1 \times 10^7$ counts per second as determined with a thin mica window Geiger tube, sufficient of the sulfur reacts on the surface to produce a radioactive deposit thereon which emits approximately 150 counts per second of beta radiation. The activated surface of the plug is stable to normal handling, hot solvents and gentle wiping. In Fig. 3, numeral 21 indicates the radioactive deposit on the end face 20 of the plug. It has been determined that such a deposit can be in the order of a single molecular layer of sulfur or less and still be effective for the purposes of this invention. Of course deposits of greater thickness are also effective.

Figure 4:
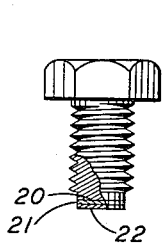
Fig. 4 represents, partly in section, a modification of a plug incorporating features of the invention.

In order to avoid any loss of radiosulfur from the plug, particularly where the environment of use or conditions of handling could expose the radiodeposit to physical deterioration, a protective coating of a suitable substance may be placed directly over the radiosulfur on the plug surface, as indicated by the numeral 22 in the embodiment of the invention shown in Fig. 4. For example, a protective coating of nickel, which has been found suitable for plugs used in engine testing, may be electroplated over the radioactive surface from a bath having the following ingredients: 19 grams of nickel sulfate, $NiSO_4$; 10 grams of ammonium sulfate, $(NH_4)_2SO_4$; and 50 cc. of concentrated ammonium hydroxide $(NH_4OH)$; diluted with water to form 150 cc. of solution. The bath is heated to 50°–60° C. When the plug is made a cathode in the electrolytic bath, a current of 0.1 ampere at 3 volts for one minute will deposit a protective coating of nickel on the radioactive surface. The nickel coating is sufficiently thin so that beta rays from the radiosulfur deposit will pass through it. A film of nickel a few microns thick has been found sufficient to protect the radioactive film, and permits extraneous deposits subsequently formed on the plug face to be scraped off, after which the nickel surface may be re-polished and the plug re-used.

After the plug has been made radioactive, and after the protective nickel coating has been applied, in those instances where it is used, the plug is calibrated to establish the effect that is produced on the initial counting rate of the radioactive surface by interposing radiation absorbers of known thickness between the plug and a radiation detection instrument. A curve may be drawn to represent the relationship between absorber thickness and counting rate. With the plug so calibrated, the attenuation of radiation from the plug caused by a deposit of a film of extraneous material on its radioactive surface can be compared with that produced by the radiation absorbers of known thickness to determine the effective thickness of the extraneous film. The result conveniently may be expressed as milligrams of deposit per square centimeter of surface. The average thickness of the deposit may be obtained by the following equation:

$$T = \frac{W}{\rho}$$

where: $T$=thickness of deposit in centimeters; $W$=thickness of deposit in milligrams per square centimeter; $\rho$=density of deposit in milligrams per cubic centimeter.

The method of using the plug, then, comprises first, measuring its initial count; second, mounting the plug in the engine so that its radioactive face is exposed to a source of deposit-forming materials when the engine is in operation; third, operating the engine to produce a deposit on the face of the plug; fourth, removing the plug from the engine and measuring its new counting rate; and fifth, by comparing the attenuation of radiation caused by the deposited film with that caused by absorbers of known thickness determining the effective thickness of the deposited film.

In Fig. 2 there is illustrated a plug 16 placed in the wall of the fuel induction system adjacent a point where the throttle valve 23 seats in the wall of its chamber 12. In some types of engine operation, and with some fuels, this area of the induction system is the site of a localized build-up of deposits sufficiently thick to interfere with the operation of the engine at idling speeds. With the present invention applied to this location, as illustrated, it is possible, by periodically removing the plug and checking its apparent radioactivity, to determine the rate of build-up of deposits at this point, and to initiate corrective measures before the build-up is sufficient to interfere with the operation of the engine. Also, it is possible, by changing fuels and varying operating conditions of the engine, to employ the radioactive plug technique to select the most desirable combination which will prevent the accumulation of deleterious deposits.

To determine the occurrence of deposits in the heat exchange chamber 13 of the fuel induction system, a modified form of plug, 24, is used, of sufficient length to pass through and be received in suitable openings 25 and 26 formed in the double walls of the chamber, so that its inner, radioactivated end 27 lies flush with the inner wall of the chamber. With this invention so applied, it is possible to determine the amount of deposits formed on the walls of the chamber 13 after any period of engine operation merely by removing the plug 24 and measuring the apparent decrease of radioactivity over that of the clean plug, and as compared to that produced by known absorbers, in the manner described heretofore.

It will be apparent that various fuels may be compared for deposit forming characteristics by operating the engine under standardized conditions for a given period of time with a designated fuel, determining the amount of deposits formed on the end of the plug, and repeating the test with other fuels. A comparison of the results will indicate the relative deposit-forming characteristics of the fuels used.

As an example of such a comparison, three fuels, designated as A, B, and C, respectively, were tested and produced the following results:

| Fuel | Period of Engine Operation, hours | Deposit Thickness, mg./cm.² |
|---|---|---|
| A | 20 | 0.50 |
| B | 20 | 0.33 |
| C | 20 | 0.06 |

Figure 5:
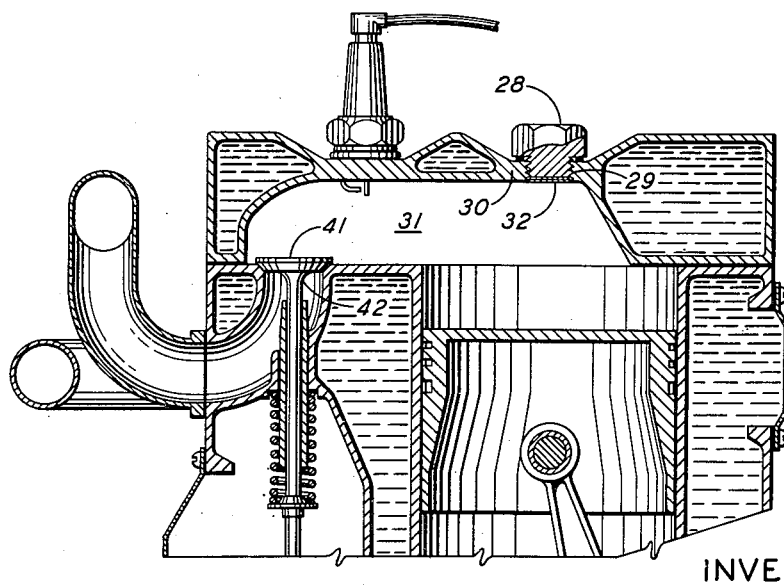
Fig. 5 represents a section through a combustion chamber of a cylinder of an internal combustion engine, along the line 5—5 of Fig. 1, and shows the disposition of a radioactive plug for measuring deposits therein.

Fig. 5 illustrates an embodiment of the invention applied to determining the quantity and rate of build-up of deposits formed in the combustion chamber of an internal combustion engine. In this modification of the invention a radioactivated plug 28 is mounted in a suitable opening 29 in a wall 30 of the combustion chamber 31 so that its radioactivated end 32 is exposed within the interior of the chamber. The deposits which form on the inner walls of the chamber form also on the radioactivated end of the plug. The plug is calibrated with radiation absorbers of known thickness before it is mounted in the wall of the combustion chamber, in the manner described heretofore. If the rate of build-up of deposits is desired, the plug is removed from the wall of the combustion chamber after consecutive predetermined intervals of engine operation and its apparent decrease of radioactivity measured for each interval. The deposits formed on the end of the plug during one interval of operation are not disturbed during the removal of the plug and the measurement of its radioactivity, so that subsequent deposits will be built up on those previously deposited, thus assuring that the final deposit thickness will be the sum of the increments of deposits formed during each interval. In this manner the rate of build-up of deposits per unit interval of engine operating time can be determined. Obviously the quantity of total deposits formed in the complete time of engine operation can be determined by measuring the apparent decrease in radioactivity from the plug caused by the accumulation of deposits formed on it for the whole period, in the manner described heretofore.

The following data exemplify the results obtained using the above-described procedure:

| Elapsed Time of Engine Operation | Deposit Thickness, mg./cm.² |
|---|---|
| 10 minutes | 0.53 |
| 20 minutes | 1.30 |
| 70 minutes | 4.43 |
| 190 minutes | 8.40 |

To check the validity of the results obtained by the use of the radioactive plug method of measurement, at the end of the test the accumulated extraneous deposits were carefully removed mechanically from the end of the plug and weighed, with the result that 8.5 mg./cm.² of deposits were recovered, corresponding to the 8.4 mg./cm.² calculated from the measurements of apparent change in radioactivity.

Figure 6:
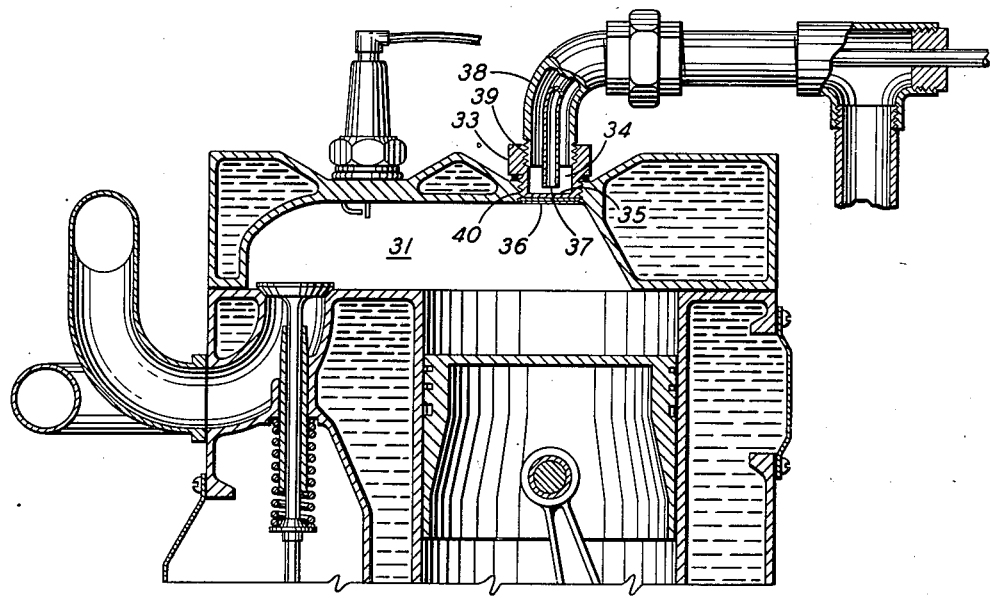
Fig. 6 represents a modification of the structure shown in Fig. 5, and illustrates a radioactive plug which has provision for controlling the temperature of the portion of the plug exposed within the combustion chamber.

For some purposes it is desirable to know the effect of the temperature of the chamber walls on the deposit forming characteristics of products contained therein. Fig. 6 illustrates a modification of this invention constructed to permit the determination of such temperature effects in the combustion chamber of an interval combustion engine.

In this embodiment of the invention, a radioactivated plug 33 is employed which is formed with an interior cavity 34 through which a heating or cooling medium may be circulated. The end wall 35 of the cavity may be made relatively thin in cross-section so that the temperature of the end face 36 of the plug will be readily affected by the temperature of the medium being circulated through the cavity 34.

A conduit 37 extends into the cavity 34 and communicates therewith to provide a means for introducing the temperature controlling medium. A second conduit 38 is connected to the plug and communicates with the cavity to provide an outlet for the circulating medium. In the exemplary illustration shown in Fig. 6, the conduit 37 is placed within and made concentric with the conduit 38 in the portions of the parts adjacent the plug to form a compact assemblage. At a point removed from the plug, conduits 37 and 38 branch away from each other to be connected to suitable equipment for circulating the temperature controlling medium. Conduit 38 may be assembled to the top portion of the plug by a screw threaded connection, as at 39. Conduit 37 extends into the cavity 34 to a point approaching the end wall 35. This construction causes the entering heat controlling medium to impinge directly onto the end wall 35 and insures a positive circulation of the medium over the end wall and throughout the cavity.

The plug 33 is detachably mounted in a suitable opening 40 in a wall of the combustion chamber 31 so that its radioactivated end face 36 is exposed within the interior of the chamber. A cooling medium, as water, may be circulated through the interior cavity 34, to hold the temperature of the exposed face 36 at a point below that which it would otherwise attain when the engine is in operation. By operating the engine for consecutive predetermined periods of time with a different plug temperature for each period, the effect of the temperature of the chamber wall on the deposit forming characteristics of the materials burned in the combustion chamber can be determined.

In cases where it is desired to measure deposits that may be built up at specific locations, or on surfaces when the removable plug technique explained above is not readily adaptable, the radioactive surface may be created directly on the surface of particular interest. For example, it may be desired to determine the amount of deposit build-up which will occur on the face 41 of the valve 42, Fig. 5, during the operation of the engine. This is accomplished by making the face 41 radioactive and determining its initial count and the effect on the count caused by radiation absorbers of known thickness, before the valve is assembled in the engine. After the engine has been assembled and operated for a period of time, the valve is removed and the attenuation in radioactivity from the face 41 due to deposits built up on it is determined. By comparing the reduced count caused by the deposits with the reduction in count caused by absorbers of known thickness, the effective thickness of the deposits is obtained.

This generalized method also has been applied to determine the thickness of metallic films produced by electroplating. For this purpose, a ferrous metal article was prepared which had one face made radioactive by forming on it a radiosulfur compound containing $S^{35}$. The article was measured for initial radioactivity and then was calibrated to determine the attenuation caused by placing absorbers of known thickness between the radioactive surface and the radiation counter. The article was made a cathode in an electrolytic bath of the same composition as the nickel depositing bath as set forth hereinbefore. A current of 0.1 ampere at 3 volts was passed through the cathode. After a period of immersion, the article was removed from the bath and the apparent radioactivity of the surface was measured to determine the effective thickness of the nickel plated thereon. To check this value, the article was also weighed to determine by this method the amount of nickel plated on it. The following representative data were obtained in this manner for three separate articles so treated.

| Article | Determination of Electroplated Ni on a Ferrous Specimen | |
|---|---|---|
| | By Weight | By Measurement of Radioactivity |
| | $Mg./cm.^2$ | $Mg./cm.^2$ |
| 1 | 1.6 | 1.6 |
| 2 | 2.5 | 2.5 |
| 3 | 2.2 | 2.0 |

It is apparent that the method of this invention provides a ready means for determining the quantity of an electroplated deposit produced on the surface of an article and thereby also provides a means for controlling plating thickness. When a surface of large area is to be plated, a small portion of the surface may be made radioactive and the initial radioactivity, and the attenuation thereof caused by absorbers of known thickness, measured for the radioactivated portion. The thickness of the electroplated film over the whole surface will then be indicated by the attenuation of radioactivity caused by the electrodeposited plating on the radioactivated portion of the surface. Thus an index is provided to determine plating thickness on articles too large or too difficult to weigh, and which is more direct than the method of attempting to predetermine plating thickness by controlling the current and time of immersion of an article in an electroplating bath.

It is not intended that the radioisotope used to create a radioactive surface for the purposes of this invention, in the manner explained above, be limited to radioactive sulfur $S^{35}$, nor that such a radioactive surface be created only by the reaction of the radioisotope with the surface. Some considerations as to the selection of a suitable radioisotope are: (1) The half-life of the radioisotope should be sufficiently long so that the radioactive decay of the radioactivated surface does not create undue inconvenience in the measurement of deposits formed on it. In the case of radioactive plugs for engine tests, it is desirable that the half-life of the radioisotope be such that the plugs can be used repeatedly over an extended period of time; (2) the specific activity and particle energy of the radiation from the radioactive surface should be such that suitable sensitivity and accuracy can be obtained for the deposit thickness encountered; (3) it is desirable, when the radioactive surface is superimposed on the surface of an article, that the radioisotope be one which can be applied to a surface in a convenient manner, and to form a product which will be stable and not subject to chemical attack or physical deterioration in the environment where it will be used. Thus, for example, the radioisotope may be caused to react on the surface, in the manner explained above, for $S^{35}$ on a ferrous surface, or it may be electroplated on a surface, or may be incorporated in a paint or varnish or plastic which can be applied to a surface.

It is desirable in choosing a radioisotope for the purposes of this invention that alpha emitters, or soft beta emitters, be used for the measurement of thin films or deposits, that hard beta emitters be used for the measurement of thicker films or deposits, and that gamma emitters be used for heavy films or deposits. Some particularly useful radioisotopes for use in this invention, based on the foregoing considerations, are:

measure the effect on the count due to subsequently deposited extraneous films. The count noted before each run was affected by the thickness of the protective nickel coating remaining on the plug at that time. Therefore, as the test continued and the protective coating became thinner, the initial count became greater.

The following representative data indicate how the count increased as the thickness of the protective nickel coating decreased.

| Run | Count, Counts/Sec. | Reduction in Coating Thickness, mg./cm.² |
| --- | --- | --- |
| 1 | 275.3 | Unburnished. |
| 3 | 279.5 | 0.09. |
| 5 | 281.6 | 0.18. |
| 6 | 283.5 | 0.27. |
| 9 | 288.8 | 0.43. |
| 11 | 290.0 | 0.50. |

It is apparent from the above data that the technique of this invention can be used to measure the decrease in dimension of films and deposits as well as the increase thereof.

The several exemplary embodiments of this invention described above are presented to indicate some specific examples of its application to

| For Measurement of Thin Films or Deposits | For Measurement of Intermediate Films or Deposits | For Measurement of Thick Films or Deposits |
| --- | --- | --- |
| 87 day $S^{35}$—0.17 m. e. v. $\beta$ | 14 day $P^{32}$—1.7 m. e. v. $\beta$ | 3 Yr. $Na^{22}$—1.3 m. e. v. $\gamma$ |
| 5000 yr. $C^{14}$—0.16 m. e. v. $\beta$ | 54 day $Sr^{89}$—1.5 m. e. v. $\beta$ | 5.3 Yr. $Co^{60}$—1.1 m. e. v. $\gamma$ |
| 152 day $Ca^{45}$—0.26 m. e. v. $\beta$ | 25 yr. $Sr^{90}$—0.61 m. e. v. $\beta$ | 225 day $Ag^{110}$—1 m. e. v. $\gamma$ |
| 300 yr. $Ni^{63}$—0.05 m. e. v. $\beta$ | 117 day $Ta^{182}$—0.53 m. e. v. $\beta$ | 117 day $Ta^{182}$—1.2 m. e. v. $\gamma$ |
| 47 day $Fe^{59}$—0.25, 0.46 m. e. v. $\beta$ | 73 day $W^{185}$—0.43 m. e. v. $\beta$ | 47 day $Fe^{59}$—1.1 m. e. v. $\gamma$ |
| 5.3 yr. $Co^{60}$—0.31 m. e. v. $\beta$ | | |

As a further example of the use of radioisotopes for the purposes of this invention, engine test plugs of the nature described heretofore have been made radioactive by coating the end surface of them with an electroplating of 5.3 year $Co^{60}$, listed in the above table.

To accomplish this a solution was made comprising 4.8 grams of $CoSO_4 \cdot 7H_2O$ containing $Co^{60}\beta$ having a total counting rate of $1.2 \times 10^6$ counts per second; 15 grams of $(NH_4)_2SO_4$; and 120 cc. of concentrated $NH_4OH$; all diluted to 300 cc. with water.

The solution was made an electrolytic bath, in which the test plug was immersed as a cathode. The solution was heated to 50–60° C. and a current of 0.1 ampere at 3 volts was passed through the bath for one minute. As a result, a radioactive film was deposited on the plug, having an initial counting rate of approximately 350 counts/sec. The radioactive cobalt film was protected with a film of nickel electrodeposited over the radioactive film in the manner described heretofore for the sulfur radioactivated plug.

A test plug, radioactivated with $Co^{60}$ and protected with a nickel coating, in the manner described above, was used for a series of engine tests to measure the build-up of deposits. Between the various runs of the test, the radioactivated face of the plug was cleaned of the deposits formed during the preceding run, and the protective nickel coating was burnished with a fine abrasive cloth to present a new surface for the succeeding test. During the burnishing process, a thin film of the protective coating was abraded away, so that it became progressively thinner as the tests continued. Before beginning a new run, the initial count of the radioactive surface was measured to establish a datum from which to the measurement of films and deposits, but are not intended to delineate the whole field of its applicability. It is within the concept of this invention that it can be applied to any circumstance where it is desired to measure films formed on surfaces, regardless of the particular form or location of the surface or the chemical or physical environment surrounding it. It is also within the concept of this invention that the technique disclosed herein can be applied to determine the change in physical dimensions of films which have been deposited or applied over a radioactivated surface, to measure either the increase or the decrease of such films caused by the accumualtion on, or deterioration from them.

We claim:

1. A device for use in measuring deposits formed within a chamber, comprising a plug adapted to be detachably mounted in a wall of said chamber and having a portion of said plug exposed within said chamber, said portion having a surface upon which deposits are formed, a radioactive material intimately associated with said surface, said plug being formed with a hollow interior portion, and means to circulate a temperature controlling medium through said hollow interior portion.

2. A method for measuring a physical property of deposits formed in a chamber of an internal combustion engine during operation thereof which comprises exposing to conditions in the chamber in which the deposit is to be measured a radioactive substance of known radioactive intensity, operating said engine to form deposits on the interior of said chamber and on said substance, and thereafter removing said substance from said chamber and measuring the apparent attenuation of radioactive intensity of the deposit coated substance as an indication of a physical property of the chamber deposit.

3. A method for measuring a change in a physical property of deposits formed in a chamber of an internal combustion engine during operation thereof which comprises exposing to conditions in the chamber in which the change in deposits is to be measured a radioactive substance on which deposits have been formed similar to the deposits formed in said chamber and the apparent radioactive intensity of which has been measured, operating said engine to cause a change in the deposits in said chamber and on said substance, and thereafter removing said substance from said chamber and measuring the change in the apparent radioactive intensity of said substance as an indication of a change in a physical property of said deposits.

4. A method for measuring a physical property of deposits formed in a substantially enclosed portion of an apparatus during operation thereof which comprises exposing to conditions in the substantially enclosed portion in which the deposit is to be measured a radioactive substance of known radioactive intensity, operating said apparatus to form deposits on the interior of said substantially enclosed portion and on said substance, and thereafter removing said substance from said substantially enclosed portion and measuring the apparent attenuation of radioactive intensity of the deposit coated substance as an indication of a physical property of the deposit formed in said substantially enclosed portion.

5. A method for measuring a change in a physical property of deposits occurring in a substantially enclosed portion of an apparatus during operation thereof which comprises exposing to conditions in the substantially enclosed portion in which the change is to be measured a radioactive substance on which deposits have been formed and the apparent radioactivity of which has been measured, operating said apparatus to cause a change in a physical property of said deposits, and thereafter removing said substance from said substantially enclosed portion and measuring the change in the apparent radioactive intensity of said substance as an indication of a change in a physical property of the deposits occurring in said substantially enclosed portion of the apparatus.

6. A method for measuring a change in a physical property of deposits formed in a substantially enclosed portion of an apparatus during operation thereof which comprises exposing to conditions in the substantially enclosed portion in which the change in the deposit is to be measured a radioactive substance, operating said apparatus to form deposits on the interior of said chamber and on said substance, removing said substance from said substantially enclosed portion and measuring the apparent radioactive intensity of the deposit coated substance, re-exposing said deposit coated substance in said substantially enclosed portion, operating said apparatus to cause a change in a physical property of said deposits, and thereafter removing said substance and measuring the change in the apparent radioactive intensity of said substance as an indication of a change in a physical property of the deposits in said substantially enclosed portion of the apparatus.

HARRISON W. SIGWORTH.
BERNARD A. FRIES.

References Cited in the file of this patent

UNITED STATES PATENTS

| Number | Name | Date |
| --- | --- | --- |
| 1,523,013 | Greenslade | Jan. 13, 1925 |
| 2,264,725 | Shoupp et al. | Dec. 2, 1941 |
| 2,476,644 | Wallhausen et al. | July 19, 1949 |
| 2,480,846 | Friedman et al. | Sept. 6, 1949 |